United States Patent Office 3,215,082
Patented Nov. 2, 1965

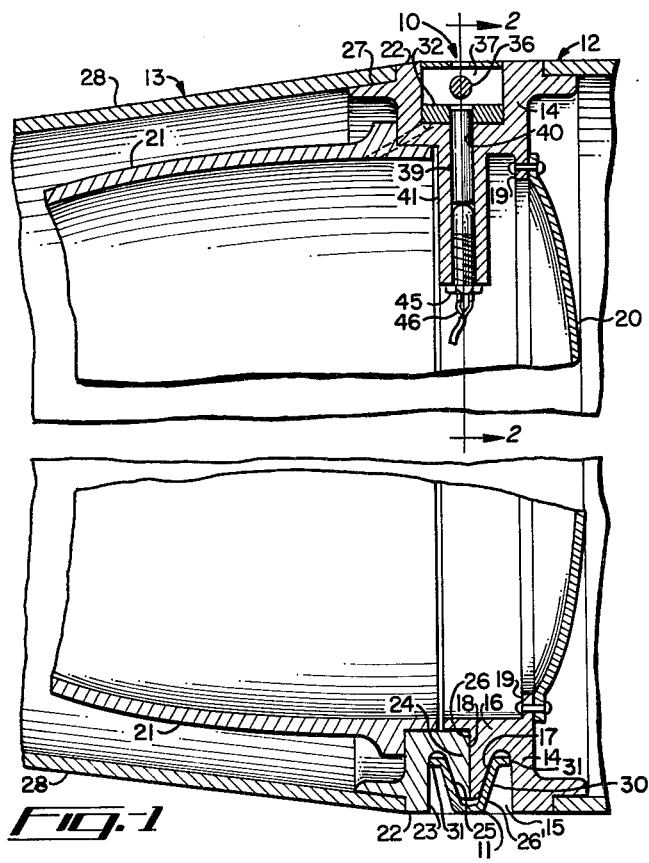
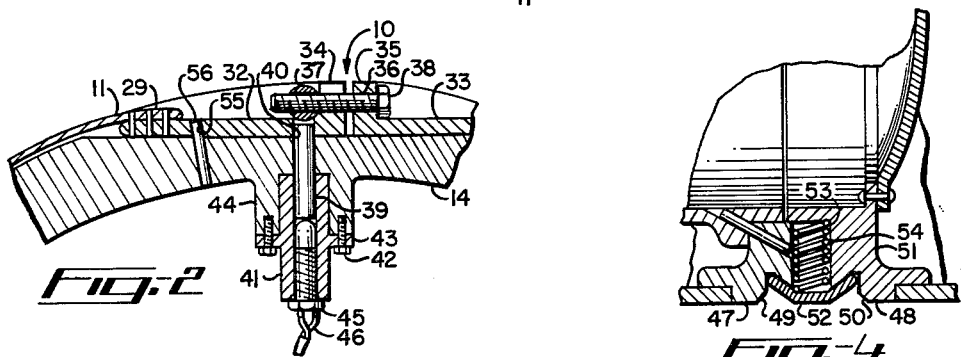
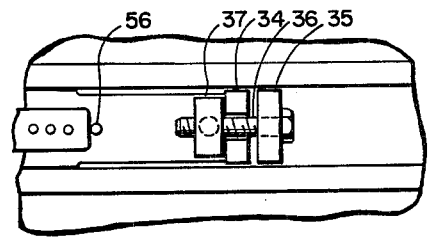

3,215,082
RAPID RELEASE DEVICE FOR CONNECTING ROCKET STAGES
Roland F. Baggs, Whittier, and Max A. Keck, Jr., West Covina, Calif., assignors to Aerojet-General Corporation, Azusa, Calif., a corporation of Ohio
Filed Sept. 24, 1962, Ser. No. 225,472
4 Claims. (Cl. 102—49)

This invention relates to rapidly releasable couplings such as those used for connecting parts together for an initial length of time and then releasing them from each other.

The invention particularly relates to a releasable coupling for large diameter tubular parts initially held in edge to edge relation such as the stages of a multi-stage rocket, and after a period of time released thereby permitting further forward movement of an upper stage or stages.

In such a use it is required that the stages be rigidly secured together until the lowest stage has burned for a predetermined time whereupon the coupling between it and the next higher stage has to be instantaneously released without any adverse effect on the accuracy of flight of the remaining stages of the rocket. Various devices have been utilized to effect separation such as explosive bolts securing the stages, or Primacord rupturing of a tubular section connecting the stages, but it has proved difficult to obtain a sufficiently uniform and simultaneous release of the means connecting the stages. It will be appreciated that any slight lack of simultaneous release of the coupling means or the impartation of lateral or coaxial forces by the means for effecting release of the stages are liable to cause tilting of the upper stage which could throw it off course.

It is an object of the invention to provide releasable means for holding tubular parts such as the stages of a multi-stage rocket rigidly together until the releasable means are operated to obtain instantaneous parting of the tubular parts.

A further object of the invention is to provide means of the kind described which are of simple construction with a minimum of working parts and thus free from danger of malfunction due to faulty operation.

Another object of the invention is to provide a coupling for rocket stages which is entirely flush with the outer surface of the rocket thereby not contributing to aerodynamic drag of the rocket.

Still further objects and features of the invention will appear in the following description and accompanying illustrative drawings in which:

FIG. 1 is a longitudinal section through a joint between a lower and upper stage of a rocket, the joint being secured by a construction embodying the invention.

FIG. 2 is a partial section on the line 2—2 in FIG. 1,

FIG. 3 is a top plan view of FIG. 2, and

FIG. 4 is a fragmentary section of a modification of the joint at a point intermediate the length of a clamping band.

Referring now to FIGS. 1 and 2 of the drawings, the numeral 10 indicates a coupling construction comprising a split resilient clamping ring 11 which holds a lower stage 12 of a rocket rigidly in edge to edge relation to an upper stage 13. Means to be described below are provided so that the ring 11 may be instantaneously released to permit separation of the upper stage after burn-out of the lower stage.

The upper end of the lower stage 12 is fitted with an adaptor ring 14 formed with a peripheral recess 15 leaving an outer flange 16 which has an outwardly sloped back face 17 and an outer face 18 normal to the longitudinal axis of the rocket. Adaptor ring 14 is also provided with an inwardly extending flange 19 to which the edge of a shallow bowl-shaped deflector 20 is connected. Deflector 20 serves to deflect the jet stream from the upper stage 13 in a symmetrical pattern when its engine is fired thereby insuring axial separation of the stages free of any disturbing side forces. The nozzle 21 of the upper stage 13 is also fitted with an adaptor ring 22 having a peripheral recess 23 leaving an outer flange 24 which is formed with an outwardly sloped back face 25 and an outer face 26 normal to the longitudinal axis of the rocket. When faces 18 and 26 are in abutment flanges 16 and 24 form an outwardly tapered flange 26' extending around the joint between rocket stages 12 and 13. The resilient clamping ring 11, later described, is drawn tight down on the tapered flange 26' and held by instantaneously releasable means. A laterally extending flange 27 on adaptor ring 22 serves to support the lower end of a sheet metal fairing 28 covering the nozzle 21.

The clamping ring 11 comprises a band 29 of steel having its edges bent to provide a channel 30. The channel 30 is provided with cut-out portions (not shown) about its circumference so that the ring 11 will have sufficient flexibility to bend about flange 26'. When the ends of the band 29 are brought together, the walls of channel 30 are forced upon the tapered flange 26' formed by half flanges 16 and 24 and rigidly hold them together. The outer edges of the channel may be reversely bent as indicated at 31.

At each end of the band 29 the channel walls are omitted and end fittings 32 and 33 are riveted to the band 29. Since the end fittings have to resist considerable force and accommodate a latch member holding them together, the fittings are thicker than the band. To position the fittings 32 and 33 within the diameter of the lower stage 12, the flanges 16 and 24 are machined away sufficiently to provide a seat for the end fittings as best seen in FIG. 2.

The band 29 can be heat treated after forming to give it the desired degree of resilience.

End fittings 32 and 33 are formed adjacent their facing ends with outwardly extending shoulders 34 and 35. Shoulder 34 is slotted to provide a pair of shoulders so that the lateral cross-arm 37 of a T bolt 36 may be positioned behind shoulder 34. Shoulder 35 is provided with an opening for receiving the outer end of the T bolt. The head 38 of the T bolt retains the bolt behind shoulder 35. The cross-arm 37 of the T bolt is formed as a short length of round rod to facilitate egress of the arm from its position behind shoulder 34. The dislodgement of the cross-arm 37 from behind shoulder 34 frees the clamping ring 11 from engagement with the upper and lower rocket stages and enables the upper stage 13 to be propelled forward by the firing of the upper stage engine away from the burned-out lower stage 12.

A latch release means is provided to disconnect the upper and lower stages on an electrical signal and comprises a radially positioned pin 39 having its outer end lying in a radial hole 40 through fitting 32 and in openings (not shown) in adaptor rings 14 and 22. The outer end of the pin is positioned below the cross-arm 37 of the T bolt 36. The inner end of pin 39 is mounted in a short barrel 41 mounted on the edge of adaptor ring 14 as by bolts 42 which pass through a peripheral flange 43 on barrel 41 and are threaded into a thickened portion 44 of the edge of adaptor ring 14.

A squib 45 is screwed into the inner end of barrel 41, the squib being fired by an electrical signal current sent into the explosive charge in the squib through lead wires 46. Firing of the of the squib 45 forces pin 39 outwardly against cross-arm 37, dislodging the cross-arm 37 by forcing bolt 36 and end fitting 33 outwardly with respect to end fitting 32. Since bolt 36 is moved substantially radially with respect to clamping ring 11, there is no significant increase in tension in the clamping ring 11. The two fittings 32 and 33 will part rapidly, because of tension in the clamping ring 11, upon cross-arm 37 being moved so that it may clear shoulder 34.

It can be appreciated that pin 39 and end fittings 32 and 33 may alternatively be arranged so that the pin 39 will strike the bolt 36 between shoulders 34 and 35. Also the contour of the recesses 15 and 23 and of the flange 26' on which the channel section clamping ring 11 is mounted may be different from thaat shown in FIG. 1. The rapid release of the clamping ring 11 from the flange 26' may be facilitated by helical springs under compression positioned in radial bores in the flange and the pin 39 may be driven outward by any suitable means other than a squib, such as a suddenly released spring or compressed air pressure. Further a plurality of clamping bands may be utilized arranged as described in place of a single band, all bands being simultaneously released.

In FIG. 4 various modifications are shown illustrating some of the possible modifications above referred to. Adaptor rings 47 and 48 are provided with V shaped grooves 49 and 50 forming a flange 51 of wider angle than the flange 26' shown in FIG. 1. The resilient clamping band 52 is formed to fit snugly against the flange 26' but its edges are free from constraint by the walls of the grooves in adaptor rings 47 and 48. At a point intermediate the length of the clamping band 52 radial holes 54, only one being shown, are bored with half of the hole being in the mating face of one adaptor ring and half in the mating face of the other adaptor ring. A helical spring 53 is positioned in each bore bearing at its inner end against the overlying projection of ring 48 and at the outer end against clamping band 52. Springs 53 are compressed by the tightening of band 52 or stressed in any suitable way during the installations of the band. When the end fittings of the band 52 are released, the force of spring 53 will ensure that the band will be thrown off the flange 51 at a point where the resilience of the band is least effective.

To facilitate installation by bringing the end fittings 32, 33 into correct alignment with the releasing pin 39, a drift pin hole 55, as seen in FIG. 2 is provided. This hole passes through end fitting 32 and its seat at the correct position to align the pin 39 and bolt 36. By positioning drift pin 56 in the hole the band may be tensioned around the joint between the rocket stages with pin 39 partly entered in hole 40. Final adjustment may be made by screwing the threaded stem of the bolt 36 into its cross-arm 37.

Preferred embodiments of the rapidly releasable coupling of our invention have been hereinbefore described and shown in the drawings by way of illustration but not as limitative of the invention since various modifications of the described embodiments may be made by those skilled in the art without departing from the scope of the invention as defined by the scope of the appended claims.

We claim:

1. A rapid release device comprising a resilient annular element having its ends in spaced apart relationship, at least one upstanding shoulder on one end of said element, a generally laterally extending projection on the other end of said element, said laterally extending projection being positioned behind said upstanding shoulder and held in engagement therewith by the tension induced in said resilient annular element, and actuatable means disposed radially inwardly of said laterally extending projection for instantaneously moving said laterally extending projection radially outwardly past said upstanding shoulder upon actuation thereof.

2. A rapid release device as set forth in claim 1, wherein said actuatable means for instantaneously moving said laterally extending projection radially outwardly comprises an explosively actuated pin positioned to contact the inner surface of said laterally extending projection and striking said laterally extending projection upon actuation.

3. In combination, first and second tubular parts disposed in end to end relation, the adjacent ends of said tubular parts being provided with abutting radially projecting flanges having surfaces mating with one another, and a rapid release device securing said flanges on said tubular parts together for connecting said tubular parts; said rapid release device comprising a resilient split ring surrounding said flanges and having means thereon frictionally clamping said flanges together, at least one outwardly projecting shoulder on one end of said split ring, a generally laterally extending projection on the other end of said split ring, said laterally extending projection being positioned behind said outwardly projecting shoulder and held in engagement therewith by the tension induced in said split ring for holding said split ring about said flanges under tension, and actuatable means disposed radially inwardly of said laterally extending projection for instantaneously moving said laterally extending projection radially outwardly past said outwardly projecting shoulder upon actuation thereof to release said device from connecting relationship with respect to said tubular parts by enabling the tension in said resilient split ring to cause the ends of said resilient split ring to be spread apart so that said means on the resilient split ring frictionally clamping said flanges together may be disengaged from said flanges.

4. The structure set forth in claim 3, wherein said actuatable means for instantaneously moving said laterally extending projection radially outwardly comprises an explosively actuated pin positioned to contact the inner surface of said laterally extending projection and striking said laterally extending projection upon actuation.

References Cited by the Examiner

UNITED STATES PATENTS

| 2,699,343 | 1/55 | Troeger et al. | 292—256.67 |
| 2,715,312 | 8/55 | Brame | 60—35.55 |
| 2,732,765 | 1/56 | Boyd | 89—1.5 |
| 2,809,584 | 10/57 | Smith | 102—49 |
| 2,896,509 | 7/59 | Musgrave | 89—1.5 |
| 2,981,187 | 4/61 | Riordan et al. | 102—49 |
| 2,982,437 | 5/61 | Wheatley | 292—256.67 |
| 3,026,772 | 3/62 | Moreland | 102—49 |
| 3,053,131 | 9/62 | Stott | 89—1 |
| 3,109,608 | 11/63 | Boehm et al. | 102—49 |
| 3,122,098 | 2/64 | Glennan | 102—49 |

SAMUEL FEINBERG, *Primary Examiner.*

ARTHUR M. HORTON, *Examiner.*